(12) United States Patent
Muramoto

(10) Patent No.: US 6,258,444 B1
(45) Date of Patent: *Jul. 10, 2001

(54) MOUSE PAD

(75) Inventor: Yoshihiko Muramoto, 6-49, Minamiyaso-cho 2-chome, Tokushima, 770-0005 (JP)

(73) Assignees: Kitajima Craft LTD, Myozai-gun; Yoshihiko Muramoto, Tokushima, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,566

(22) PCT Filed: Nov. 5, 1997

(86) PCT No.: PCT/JP97/04023

§ 371 Date: Jul. 7, 1999

§ 102(e) Date: Jul. 7, 1999

(87) PCT Pub. No.: WO98/20412

PCT Pub. Date: May 14, 1998

(30) Foreign Application Priority Data

Nov. 6, 1996 (JP) .................................. 8-311368

(51) Int. Cl.[7] .............................. B32B 3/00; A47G 29/00; A47B 91/00
(52) U.S. Cl. ...................... 428/172; 428/81; 248/346.01; 248/918
(58) Field of Search ...................... 428/156, 172, 428/192, 81, 98, 423.4, 424.6; 248/346.01, 118.1, 918; 400/715; 2/16, 20

(56) References Cited

U.S. PATENT DOCUMENTS 5,492,298 * 2/1996 Walker .............................. 248/346.01
5,678,800 * 10/1997 Markussen ...................... 248/346.01

* cited by examiner

*Primary Examiner*—Donald J. Loney
(74) *Attorney, Agent, or Firm*—Armstrong, Westerman, Hattori, McLeland & Naughton, LLP

(57) ABSTRACT

A mouse pad which enables a mouse to be manipulated more easily and gives less fatigue to the wrist. A mouse pad (A) has a surface portion (10) and a thick base portion (20), the surface portion (10) having a mouse running surface (10a) inclined relative to a back surface of the thick base portion (20). The surface portion (10) is formed of vinyl chloride or a leather material, and thick base portion (20) is formed of a shock absorbing material such as urethane foam or the like.

4 Claims, 5 Drawing Sheets

MOUSE PAD

TECHNICAL FIELD

The present invention relates to a mouse pad, on the surface of which a mouse for use with computers for input operation is manipulated to run.

BACKGROUND ART

A mouse is a box-shaped input device including a ball arranged therein to expose from the bottom side, and is used primarily with personal computers. The mouse is manipulated to run on the surface of a desk or the like when used. A mouse pad is also often employed to make the mouse run in a more stable manner and to achieve accurate input operation. As shown in FIG. 5, a conventional mouse pad B is formed of a plate being substantially uniform in thickness, and is made of vinyl chloride or the like.

DISCLOSURE OF THE INVENTION

However, because the conventional mouse pad is formed of a plate being substantially uniform in thickness, there have been such problems that a mouse is not satisfactorily easy to manipulate and the user's wrist is fatigued. More specifically, as shown in FIG. 5, the wrist is bent inward (downward) from the normal state during manipulation of the mouse. An angle Q (see FIG. 5) between the arm and the hand is larger than the normal angle. This means that the user manipulates the mouse while the wrist is in the unnatural state. As a result, the mouse is not satisfactorily easy to manipulate and the wrist is fatigued. In particular, continuing manipulation of the mouse for a long time, while the wrist is in the unnatural state, makes the wrist much fatigued.

It is therefore an object of the present invention is to provide a mouse pad which enables a mouse to be manipulated more easily and gives less fatigue to the wrist.

The present invention has been accomplished with the view of solving the problems set forth above. According to a first aspect of the present invention, in a mouse pad for use in manipulating a mouse, the mouse pad has a mouse running surface on the front side on which the mouse runs, and a back surface on the back side brought into contact with a set surface on which the mouse pad is placed, the mouse running surface being inclined relative to the rear surface of the mouse pad.

In use of the mouse pad according to the first aspect, the mouse is placed on the mouse running surface and then manipulated. Since the mouse running surface is inclined relative to the back surface of the mouse pad, the user can manipulate the mouse with the wrist kept in the natural state. Therefore, the mouse is easier to manipulate and the wrist is less fatigued. In other words, the so-called "slope effect" can be developed from the ergonomic point of view.

According to a second aspect of the present invention, in a mouse pad for use in manipulating a mouse, the mouse pad has a mouse running surface on which the mouse runs, the mouse running surface being inclined relative to a set surface on which the mouse pad is placed.

In use of the mouse pad according to the second aspect, the mouse is placed on the mouse running surface and then manipulated. Since the mouse running surface is inclined relative to the set surface, the user can manipulate the mouse with the wrist kept in the natural state. Therefore, the mouse is easier to manipulate and the wrist is less fatigued. In other words, the so-called "slope effect" can be developed from the ergonomic point of view.

According to a third aspect of the present invention, in the mouse pad according to the first or second aspect, the mouse pad is triangular or trapezoidal in sectional shape.

According to a fourth aspect of the present invention, in the mouse pad according to any one of the first to third aspects, the mouse running surface is substantially rectangular and planar.

According to a fifth aspect of the present invention, in the mouse pad according to any one of the first to fourth aspects, the mouse pad comprises a surface portion having the mouse running surface, and a thick base portion having the back surface brought into contact with the set surface on which the mouse pad is placed, the surface portion being made of vinyl chloride or a leather material, the thick base portion being made of a shock absorbing material.

In the mouse pad according to the fifth aspect, the mouse pad comprises the surface portion and the thick base portion, the surface portion being formed of vinyl chloride or a leather material, thick base portion being formed of a shock absorbing material. Therefore, the mouse is able to run on the mouse pad with stability.

BEST MODE FOR CARRYING OUR THE INVENTION

An embodiment of the present invention will be described below with reference to the drawings.

Figure 1:
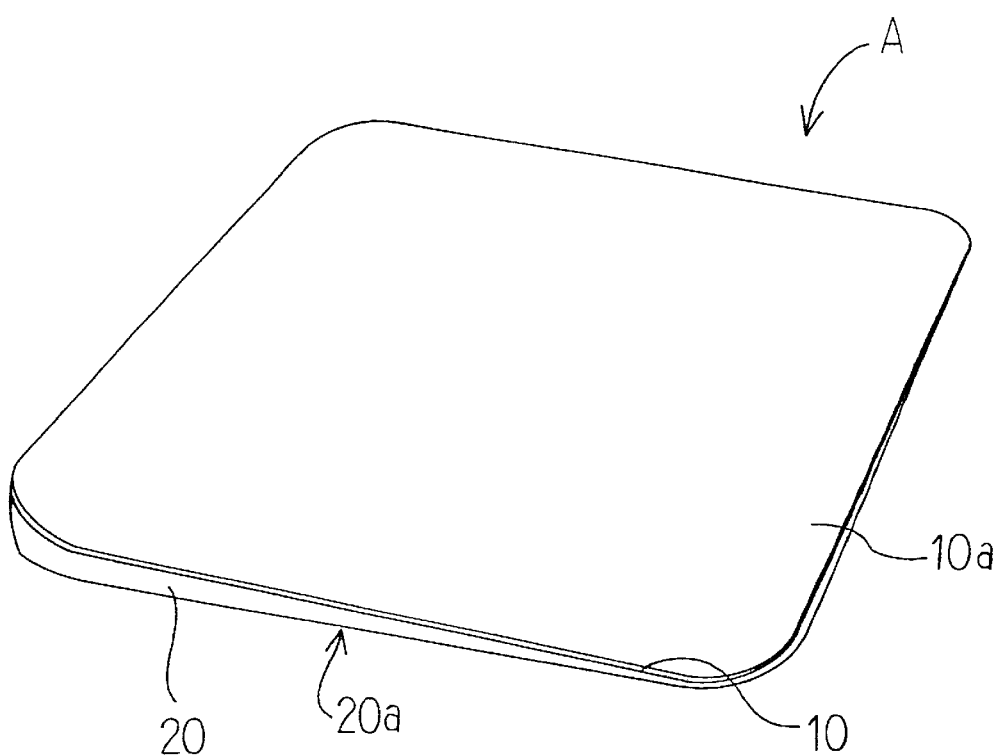
FIG. 1 is a perspective view showing the construction of a mouse pad according to an embodiment of the present invention.
Figure 2:
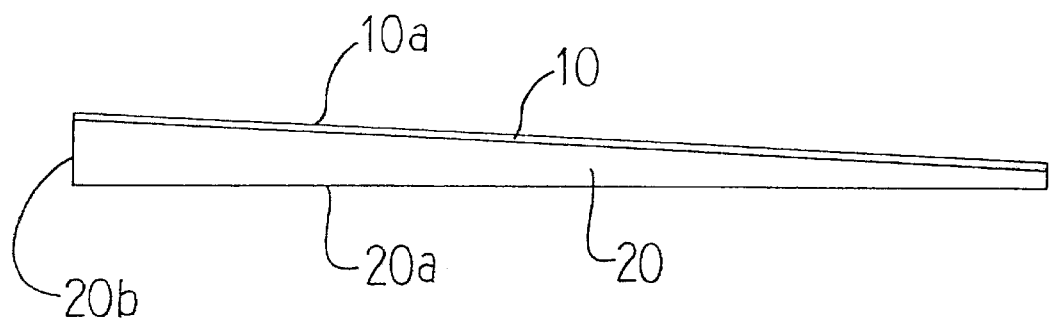
FIG. 2 is a side view of the mouse pad according to the embodiment of the present invention.

A mouse pad A according to the present invention is constructed as shown in FIGS. 1 and 2, and comprises a surface portion 10 and a thick base portion 20. The surface portion 10 is in the form of a sheet of which surface provides a planar mouse running surface 10a. More specifically, the surface portion 10 is formed of a substantially rectangular sheet having rounded corners and being uniform in thickness. The surface portion 10 is made of, e.g., vinyl chloride or a leather material. Examples of other materials usable as the surface portion 10 include cloth, unwoven cloth, synthetic leather, polypropylene, paper, etc.

The thick base portion 20 is substantially in the form of a plate having an upper surface inclined relative to a back (bottom) surface 20a thereof. As shown in FIG. 2, the thick base portion 20 is substantially trapezoidal when viewed from a side. A sectional shape of the thick base portion 20 is also substantially trapezoidal. It is to be noted that the thick base portion 20 may be triangle in side and sectional views.

An angle, at which the mouse running surface is inclined relative to the back surface of the thick base portion 20 or to a set surface on which the mouse pad is placed, is optional. Theoretically, the angle may be set within the range of 3° to 45°. Considering the manner in which the mouse pad is used in practice at present, an appropriate range of the angle is from 3° to 10° in which the mouse pad can maintain the so-called "slope effect".

In the above appropriate range, the angle at which the "slope effect" is developed most conveniently from the ergonomic point of view is 6° as shown in FIGS. 1 and 2. A mouse pad having the inclination angle of 6° is planned to commercialize as, for example, "Nanamekun" (trademark pending, by KITAJIMA CRAFT LTD.).

When the mouse pad is employed in the special situation, the inclination angle can be set to be larger than 10°.

Further, when the thickness of the mouse pad is set to be within 10 mm, for example, in order to comply with the code of ordinary mail in Japan, the inclination angle is about 3° and the mouse pad is in the form of a nearly flat plate, taking into account the usual area of mouse pads. The inclination angle of 3° is a minimum limit at which the so-called "slope effect" can be least maintained with the manner in which the mouse pad is used in practice at present.

The thick base portion 20 is made of a shock absorbing material such as polyurethane foam or the like. In addition to polyurethane foam, the material of the base portion may be any of synthetic resin foams such as polyurethane foam and synthetic resin sponges, plastics such as acrylic resin, vinyl chloride resin and polypropylene, metals such as iron and aluminum, ceramic ware such as ceramics and glass, and natural materials such as leather and wood. In the case of using a metal, wood or the like as the material of the thick base portion 20, the surface of the mouse pad can be inclined three-dimensionally by any suitable means such as slicing or assembling. A resulting space may be utilized to bury a high-tech part such as a sensor, a clock or a liquid crystal therein.

The surface portion 10 and the thick base portion 20 are joined together by bonding the back surface of the surface portion 10 to the upper surface of the thick base portion 20. In other words, looking the mouse pad A as one unitized structure in its entirety, the mouse running surface 10a defined by the surface of the mouse pad A is inclined relative to the back surface 10a of the thick base portion 20.

Figure 3:
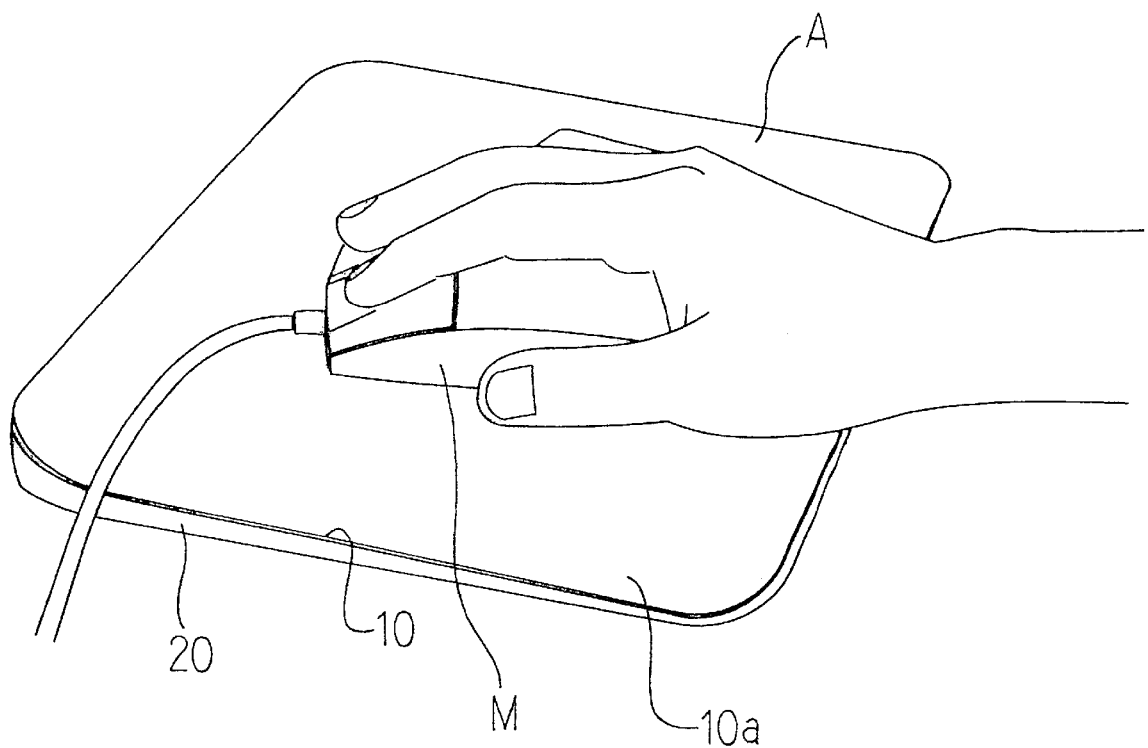
FIG. 3 is a perspective view showing the mouse pad according to the embodiment of the present invention in a state during the use.

The manner of usage of the mouse pad A having the above-described construction will be described with reference to FIGS. 3 and 4.

Figure 4:
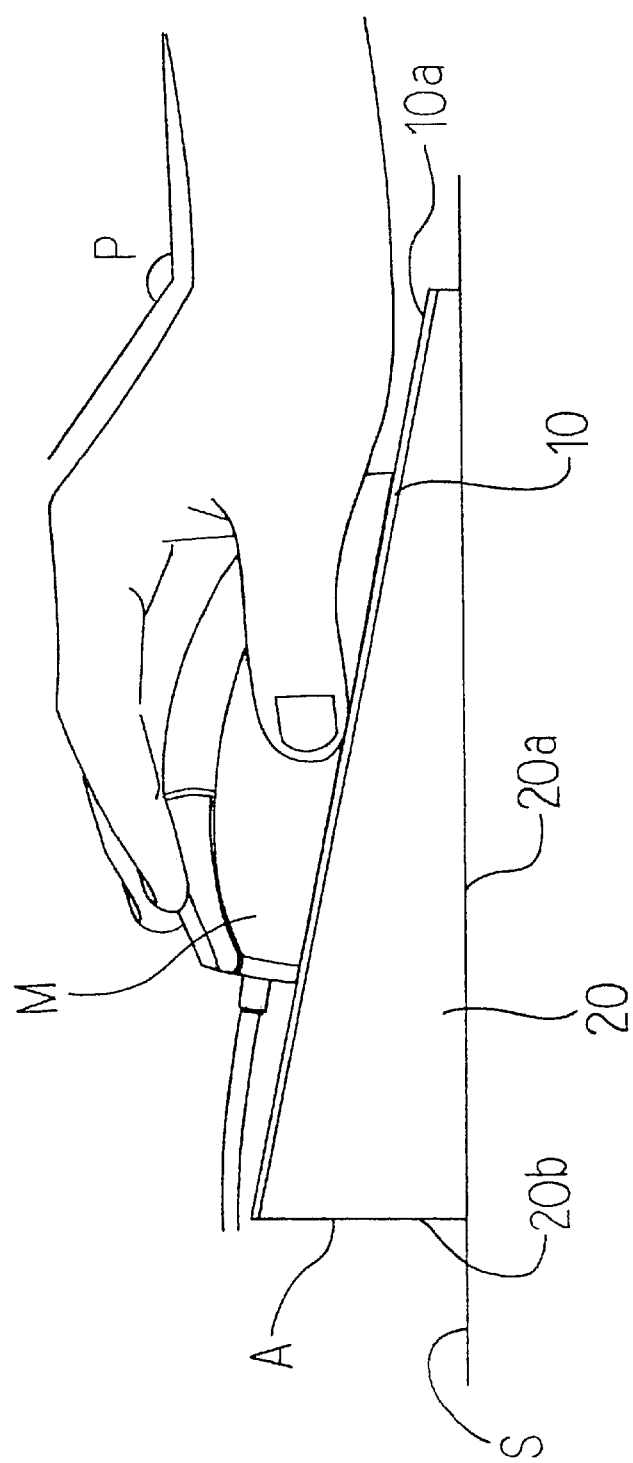
FIG. 4 is a side view showing the mouse pad according to the embodiment of the present invention in a state during the use.

The mouse pad A is placed, as shown in FIG. 4, on a predetermined set surface S given by the surface of a desk, a table or the like. In a state shown in FIG. 4, the mouse running surface 10a is sloped down toward the user, and a wall surface 20b of the thick base portion 20 is positioned on the side away from the user. A mouse M is then placed on the mouse running surface 10a defined by the surface of the mouse pad A. The user manipulates the mouse M by grasping it with the hand as shown in FIG. 3.

Figure 5:
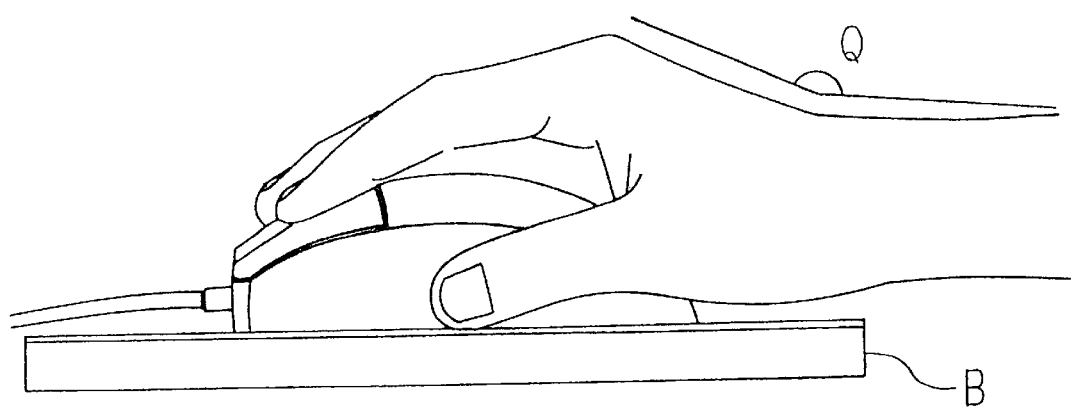
FIG. 5 is a side view of a conventional mouse pad in a state during the use.

During the manipulation, since the mouse running surface 10a of the mouse pad A is sloped down toward the user, an angle P formed between the arm and the hand is smaller than the angle Q (see FIG. 5) in the case of using the conventional mouse pad, as shown in FIG. 4, thus resulting in that the wrist is kept in the natural state. Accordingly, the mouse is easier to manipulate and the wrist is less fatigued. Note that the inclination angle of the mouse pad A shown in FIG. 4 is somewhat exaggerated to more clearly illustrate the bent condition of the wrist.

As an alternative manner of usage, the mouse pad A may be used in such an orientation that the mouse running surface 10a is slowed down in an opposite direction. Specifically, the wall surface 20b of the thick base portion 20 is positioned to face the user, and the top end of the mouse pad A is located on the side close to the user. Then, the user manipulates the mouse M on the mouse running surface 10a by the fingers with the wrist rested on the top end of the mouse pad A. This condition makes the wrist less fatigued because it is not needed for the user to hold the wrist floated while manipulating the mouse M.

Further, since the surface portion 10 is formed of a vinyl chloride resin, a leather material or the like and the thick base portion 20 is formed of a shock absorbing material such as urethane foam or the like, the mouse can be run with stability. Also, the mouse pad may be given with a non-slip function by additionally applying a suitable material to the back surface thereof (i.e., a placement surface of the mouse pad).

While the mouse pad A has been described as being substantially rectangular in a plan view, it may have any other suitable shape such as a circle, ellipse, heart or triangle, for example, so long as the mouse is able to run on the mouse pad. Further, an outer periphery of the mouse pad may be trimmed into an irregular shape, for example, so that the mouse pad has a change in its outer configuration.

Moreover, while the mouse pad A has been described as being of a two-layered structure comprising the surface portion 10 and the thick base portion 20, it may be of a one-layer structure or three or more-layered structure.

INDUSTRIAL APPLICABILITY

With the mouse pad of claim 1 according to the present invention, since the mouse running surface is inclined relative to the back surface of the mouse pad, the user can manipulate the mouse with the wrist kept in the natural state. As a result, the mouse is easier to manipulate and the wrist is less fatigued.

With the mouse pad of claim 2, since the mouse running surface is inclined relative to the set surface on which the mouse pad is placed, the user can manipulate the mouse with the wrist kept in the natural state. As a result, the mouse is easier to manipulate and the wrist is less fatigued.

Particularly, with the mouse pad of claim 5, since the mouse pad comprises the surface portion and the thick base portion, the surface portion being formed of vinyl chloride or a leather material, thick base portion being formed of a shock absorbing material, the mouse is able to run on the mouse pad with stability.

It is further possible to additionally give the mouse pad of the present invention with a new function to serve as a small ornamental article, which contributes to providing a relaxed atmosphere or a mentally stable feel, by utilizing the three-dimensional structure of the pad. For example, original mouse pads may be produced in small lot by using unwoven cloth adaptable for printing as the material of the upper surface portion, and printing favorite figures, patterns, marks thereon by digital printing or any other suitable means. Alternatively, when the mouse pad is not used, it may serve as an interior ornament such as a mural decoration by using a high quality material (for both the upper surface portion and the base portion) and machining a hanging hole in an appropriate position of the mouse pad.

What is claimed is:

1. A mouse pad for use in manipulating a mouse, comprising:

a surface portion having a mouse running surface on a front side of said mouse pad, said surface portion being made of vinyl chloride or leather material, and a base portion supporting said surface portion, said base portion being made of polyurethane foam, said base portion having a back surface on a back side of said mouse pad, said back surface being for contact with a setting surface on which said mouse pad is to be placed, wherein said mouse running surface is inclined at an angle between 3 and 10 degrees relative to the back surface of said mouse pad, said mouse pad has a cross section of a triangular or trapezoidal shape, and said mouse running surface is substantially rectangular and planar.

2. The mouse pad according to claim 1, wherein said mouse running a surface is square.

3. A mouse pad for use in manipulating a mouse, comprising:

a surface portion having a mouse running surface on a front side of said mouse pad, said surface portion being made of vinyl chloride or leather material, and a base portion supporting said surface portion, said base portion being made of polyurethane foam, said base portion having a back surface on a back side of said mouse pad, said back surface being for contact with a setting surface on which said mouse pad is to be placed, wherein said mouse running surface is inclined at an angle between 3 and 10 degrees relative to the setting surface on which said mouse pad is to be placed, said mouse pad has a cross section of a triangular or trapezoidal shape, and said mouse running surface is substantially rectangular and planar.

4. The mouse pad according to claim 3, wherein said mouse running surface is square.

* * * * *